(Model.)
3 Sheets—Sheet 2.
S. C. WELLS.
APPARATUS FOR THE MANUFACTURE OF SALT.
No. 297,323. Patented Apr. 22, 1884.
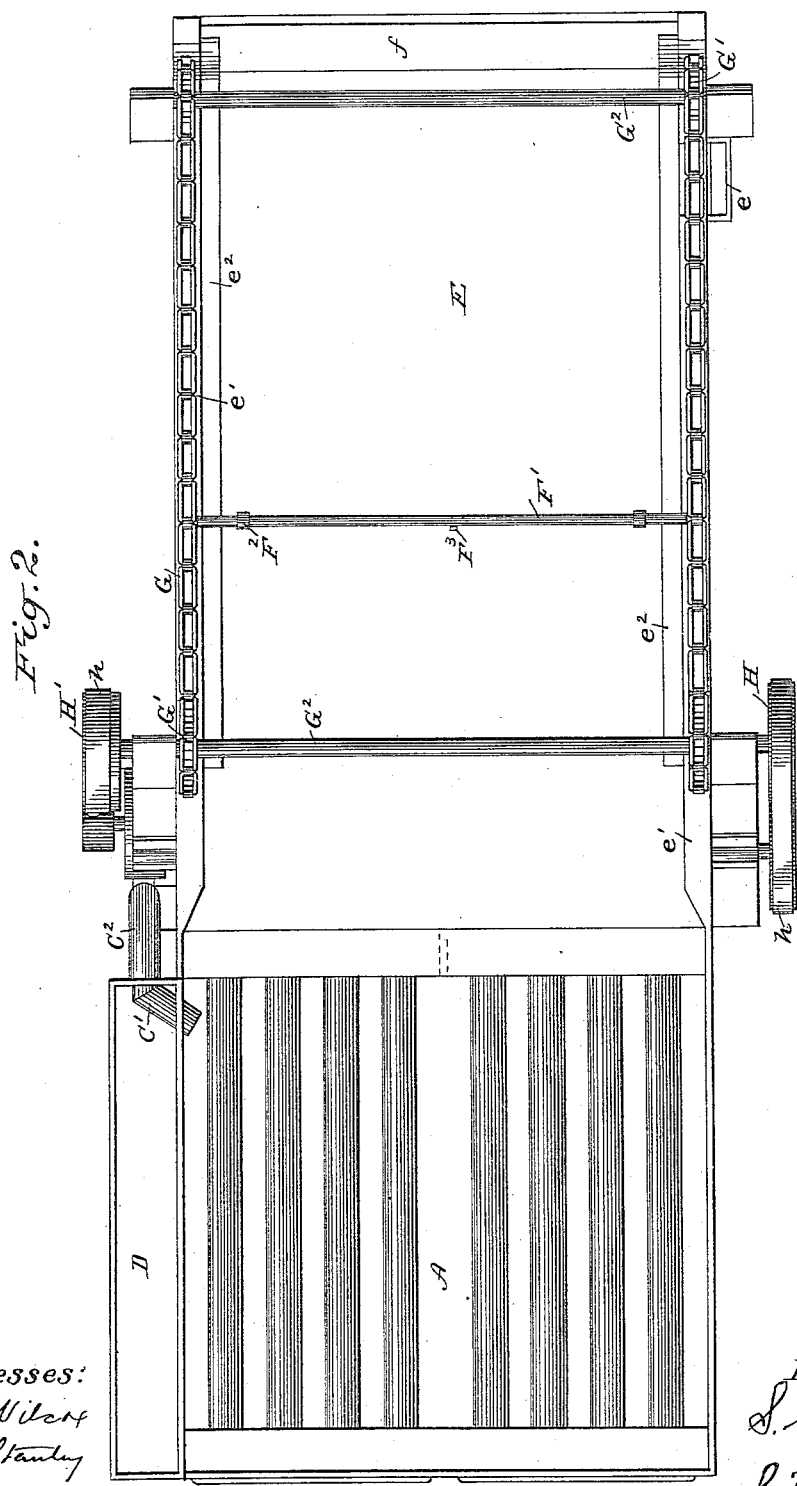
Witnesses:
F. T. Wilcox
E. L. Stanley
Inventor:
S. C. Wells
By G. W. Foree
Atty (Model.)  3 Sheets—Sheet 3.
S. C. WELLS.
APPARATUS FOR THE MANUFACTURE OF SALT.
No. 297,323.  Patented Apr. 22, 1884.
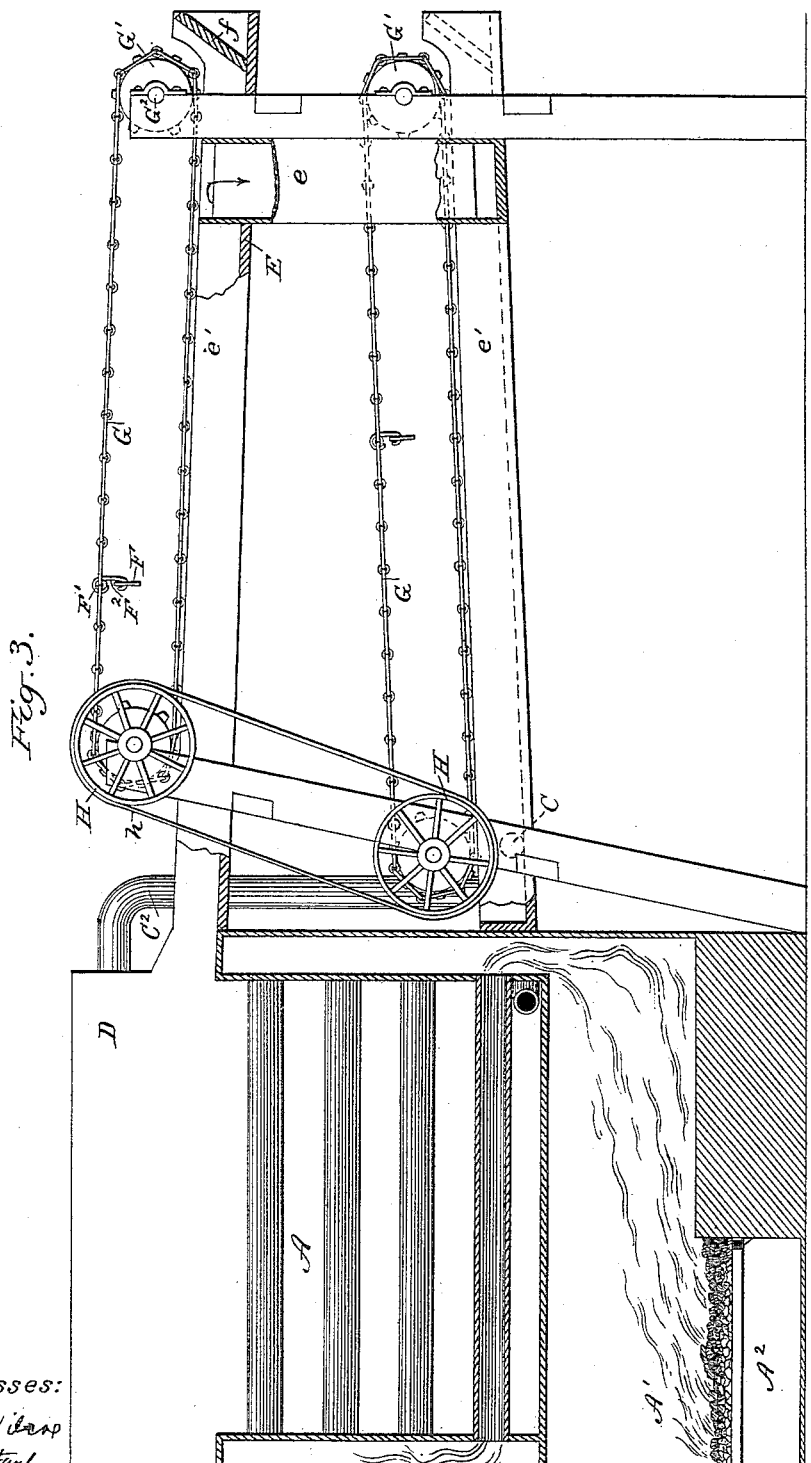

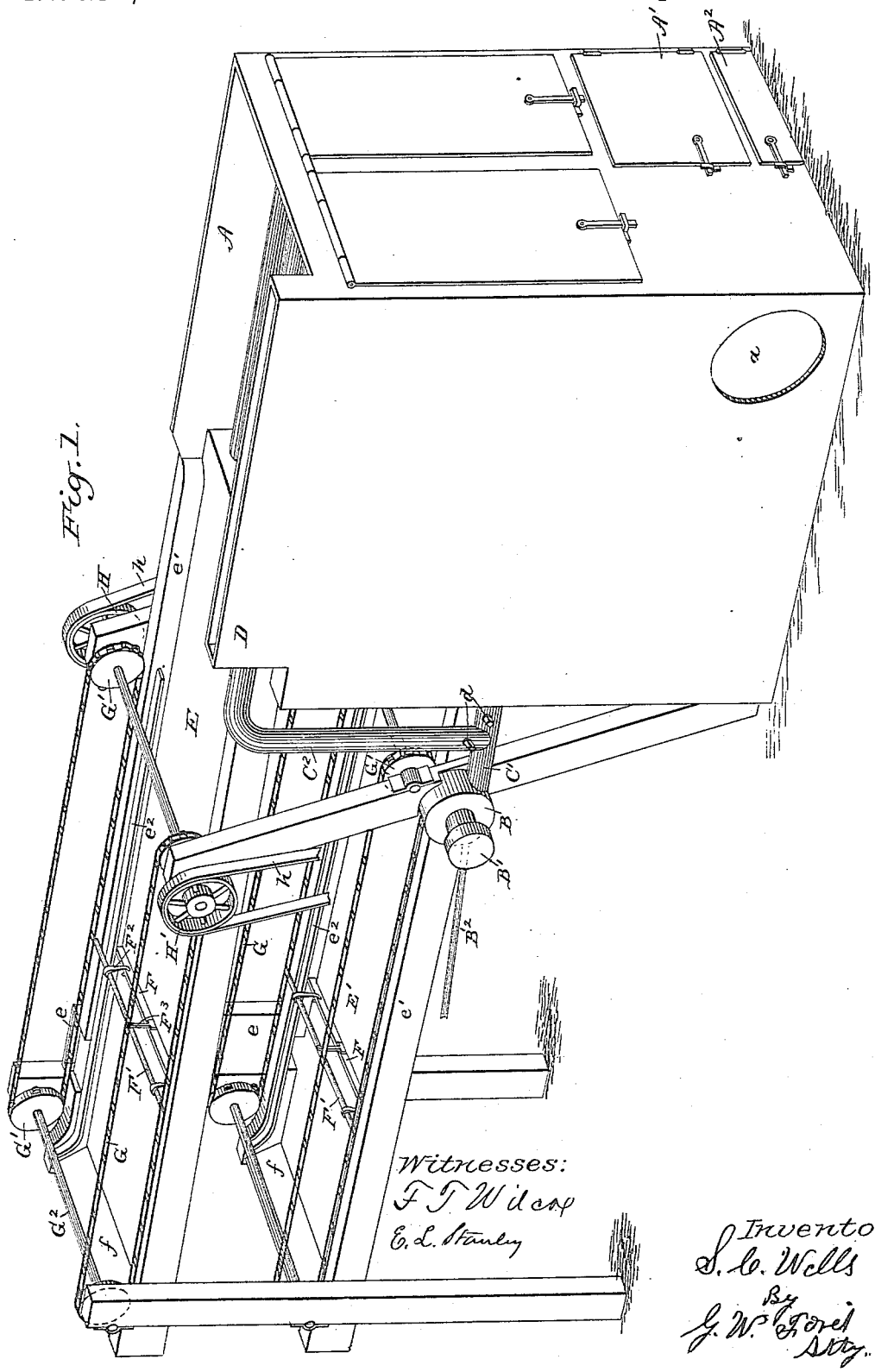

UNITED STATES PATENT OFFICE.

SCHUYLER C. WELLS, OF LE ROY, NEW YORK.

APPARATUS FOR THE MANUFACTURE OF SALT.

SPECIFICATION forming part of Letters Patent No. 297,323, dated April 22, 1884.

Application filed February 1, 1884. (Model.)

*To all whom it may concern:*

Be it known that I, SCHUYLER C. WELLS, a citizen of the United States, residing at Le Roy, in the county of Genesee and State of New York, have invented a new and useful Improvement in Apparatus for the Manufacture of Salt, of which the following is a specification.

My invention relates to improvements in the manufacture of salt in which artificial heat is used to aid in the evaporation and release of the salt held in solution; and the objects of my invention are, first, to evaporate a greater amount of water with a certain amount of fuel, thereby producing a greater quantity of salt than heretofore attained; second, to provide a brine-heater, with fire-box and return-flues, so arranged as to utilize the fuel more perfectly, and the force of combustion, in combination with a double grainer—one directly over the other—and a forced circulation, maintained as hereinafter described; third, to provide facilities for maintaining the heated brine to a certain temperature by the use of a circulating force that will insure a rapid evaporation and not allow crystallizations to form within the brine-heater; fourth, to provide a brine-heater, in combination with a double grainer, so arranged that forced circulation is maintained, and the coldest brine is delivered to the hottest surface of the heater, and is made to flow through the grainer where the salt crystallizes and deposits, as hereinafter described; fifth, to provide an automatic agitator, whereby the surface of the brine, as it circulates through the grainer, is agitated, which causes the salt crystals to break and settle; sixth, to provide, in combination with the agitator, a salt-conveyer, by which the salt is removed from the grainer, as hereinafter described; seventh, to provide a brine-heater, in combination with a double grainer, so arranged as to utilize space and produce a greater quantity of salt; eighth, to provide a brine-heater, in combination with a double grainer, so arranged as to separate the gypsum from the salt, thereby insuring a greater degree of purity, as hereinafter described; ninth, to provide a brine-heater so arranged with a centrifugal pump and steam-jet that circulation is maintained as hereinafter described; tenth, to provide a brine-heater, in combination with a double grainer, so arranged, one directly over the other, and connected at the outer ends by a conduit, that by the use of the pump a continuous circulation is maintained. I attain these objects by the mechanism illustrated in the accompanying drawings, in which—

Figure 1 is a perspective view taken from the side upon which the pump is located. Fig. 2 is a top plan view. Fig. 3 is a sectional view with the outer covering of the boiler removed, so as to show the course of the heated air in its passage through the flues as indicated by the arrows.

Similar letters refer to similar parts throughout the several views.

A is the brine-heater, provided with the usual longitudinal heating-tubes, as well as the ordinary doors for feeding, cleaning, &c.

A' is the fuel-chamber, and $A^2$ the ash-box underneath the same. This fuel-chamber or fire-box is directly underneath the brine-heater and extends the entire length longitudinally, and covers about one-half of the lateral surface to a vertical dividing-wall, which prevents the heat from coming in direct contact with the remaining surface of the heater. The heated air, as it rises, passes first through the flues that are located above the fire, entering the rear ends and escaping at the front ones, and from thence into the forward end of the flues upon the opposite side of the dividing fire-wall, and, passing out of the rear end of the tubes and down into the large exit-flue lying under the half of the heater remote from the fire, traverses the length of the said flue and into the smoke-stack entrance, which in this instance is shown in the round opening designated $a$.

B represents a centrifugal pump, the valves of which are operated by the power attached to the driving-pulley B'.

$B^2$ is a pipe for injecting steam into the pump, to prevent crystallization within the pump or the pipes connecting therewith.

C is the inflow-pipe to the pump, and C' the exit-pipe, by which the brine may be forced into the heater at the bottom.

$C^2$ is a vertical pipe, connecting at its lower end with pipe C', by means of which the brine is discharged into the top of the upright flue D.

d are stop-cocks—one in each of the exit-pipes—so that the brine can be forced into the upright flue at the top or bottom, as may be desired.

E E' are evaporating-grainers—one above the other—in which the heated brine is forced to circulate, and on the bottom of which the salt is deposited in its passage, as will be hereinafter explained.

e is a conduit connecting the upper grainer (designated E) with the under grainer, E', through which the brine upon the upper grainer is conducted to the lower one, for a purpose hereinafter explained. These grainers have side pieces, e', which rise above the level sufficiently far to hold the necessary amount of brine undergoing the process of evaporation.

$e^2$ are ribs secured to the side pieces, which project inwardly so as to form a channel above the floor, within which the ends of the rake-head F pass in their movement over the grainer, and prevents the rake from rising while at work. These ribs at the rear end are made concentric with the circumferential part of the chain-wheel, so as to keep the rake in working position a sufficient length of time to cause the removal of the accumulated salt upon the drainer.

f are inclined drainers located at the ends of the grainers remote from the heater, upon which the accumulated salt is thrown up in each revolution of the endless chains carrying the rakes. These grainers may be of any required length—say from two hundred to three hundred feet, running measure, for each grainer. In this circuit of four hundred or more feet, before the return of the brine to the heater, the fluid is sufficiently evaporated and cooled to cause the deposit of a large quantity of the salt held in solution. The rake-heads F are attached to cross-rods F' by hinged pendants $F^2$, and are locked in working position by an upright, $F^3$, upon each rake.

G are endless sprocket-chains, and G' sprocket-wheels for driving the same.

$G^2$ are longitudinal shafts, upon which the sprocket-wheels are mounted.

H are pulleys connecting (by the belt h) the chain mechanism upon each grainer, and by which the rakes are driven in a uniform manner.

H' is a driving-pulley mounted upon the end of one of the shafts $G^2$, for applying the power by which the endless raking machinery is to operate so as to automatically agitate the surface of the brine and remove the salt deposited through the process of evaporation.

The practical operation is substantially as follows: The brine containing the salt in solution is allowed to flow into the upright flue D, by which the brine-heater is filled and overflows into grainer E, which, when full, overflows into and fills grainer E'. The fire being made under the heater, the pump is started, which forces the brine from grainer E' against the side of the heater, as shown, which gives a circular rising motion between the heated flues, and, delivering the coldest brine at the hottest surface of the heater, the brine begins to rise and gravitates toward the conduit e, which overflows into grainer E', and thus a continuous circulation is maintained. As before mentioned, these grainers are of some considerable length, so that the brine, in its outward and return flow, evaporates, and the crystals of salt which form upon the surface of the brine are caused to settle upon the floor of the grainer by the counter-current made by the rakes, as hereinafter described, which, with each subsequent revolution of the endless chains carrying the rake, are removed to the drainers at the rear. The accumulation of salt upon the drainers from a single raking remains until a succeeding revolution of the rake is had, when the more recent and heavier deposit crowds the previous raking higher up the drainer, and this process is continued until the drainer is filled and the first deposit is crowded off into the storage-bin. It will be seen that by this automatic operation a continuous flow of the manufactured salt may be had by having all the parts work in harmony.

The rake is made of one solid bar, of sufficient width to remove the accumulations, but does not reach to the top of the brine, and as the rake moves through the liquid at a more rapid rate than the natural flow, the said liquid is banked up immediately in front of the rake, which, in seeking an outlet, passes over the top of the bar, thus leaving a wake or counter current in its rear, which causes the salt crystals to break and settle on the grainer.

In order that a high degree of heat may be maintained, with the consequent rapid evaporation, and to avoid the attending incrustations which readily form upon, and to the great detriment of, the heating-tubes, when the salt is allowed to settle upon them, I have succeeded in obtaining a forced circulation by the use of the centrifugal pump, which forces the cooler brine from the lower grainer underneath the flues, where the fire is the hottest, by which the brine is heated to a higher degree, which takes up or dissolves all grains of salt that may enter the brine-heater, and holds it in solution until it passes off onto the grainer in a crystallized state, and settles, as before explained. Another advantage in this forced circulation is that I am able to build the fire directly underneath the heater, and thus utilize the entire heat, as before mentioned. By the use of the stop-cocks in the exit-pipes of the pump the coolest brine may be thrown directly underneath the tubes; or it may be discharged into the feed-tube at the top, and from there work (by gravitation) its way down under the flues. As the force of the current is regulated by the velocity at which the pump is run, a high or low degree of heat may be maintained by having the pump run at a greater or less speed, as may be desired.

To release the gypsum from the solution, a high degree of heat is required, which is had immediately at the mouth of the brine-heater at the overflow upon the top grainer, which causes it to settle upon the open space (not traversed by the rake) found at that spot, and before the separation of the salt, which commences to deposit at a point farther along upon the grainer, where the brine is cooler. By this arrangement the gypsum can be removed, and not become mixed with the salt.

Having now fully described my invention and the operation of the same, what I claim as new, and desire to secure by Letters Patent, is—

1. The combination of the fire-box, the heating-flues directly over and at the side of the same, the dividing-wall, and the double grainers—one over the other—substantially as described.

2. The combination of the fire-box underneath the heater, the heating-tubes, the dividing fire-wall, the upright feed-flue, the force-pump, and the double grainers, arranged and operating substantially as described.

3. The combination of the solid rake-bar, the rake-driving mechanism, and the grainers—one above the other—substantially as described.

4. The combination of the rake-bar connecting the two rake-driving chains, the grainer, and the inclined drainer at the rear end of the grainer, all arranged and operating substantially as described.

5. The combination of the brine-heater and the double grainer—one arranged over the other—substantially as described.

6. The combination of the brine-heater, the double grainer, the centrifugal pump, the pump exit-pipe reaching underneath the brine in the heater, and the open space upon the upper grainer, all arranged and operating substantially as described.

7. In a brine-heating device having return heating-flues, the combination of the upright feed-flue, the centrifugal pump, the steam-injecting pipe, connected therewith, and the pump exit-pipe, all arranged and operating substantially as described.

8. The combination of the upper grainer, the lower grainer, the connecting conduit, and the force-pump arranged and operating substantially as described.

9. The combination of two open-linked endless chains, running upon the same vertical level, the toothed chain-operating wheels, two of which are secured to a shaft in such manner that the two chains are kept in the same relative position, the flexibly-hinged rake, the central rake-locking devices, and the rake-retaining ribs, all arranged and operating substantially as described.

SCHUYLER C. WELLS.

Witnesses:
WM. S. COE,
G. W. FORD.